(12) United States Patent
Justen et al.

(10) Patent No.: US 8,473,623 B2
(45) Date of Patent: Jun. 25, 2013

(54) METHOD FOR MANAGING A COMMUNICATION BETWEEN A SERVER DEVICE AND A CUSTOMER DEVICE

(75) Inventors: Pascal Marie Edouard Julien Justen, Sint-Pieters-Woluwe (BE); Christoph Stevens, Stekene (BE); Werner Mario Liekens, Sint Katelijne Waver (BE); Jan Coppens, Ghent (BE); Willem Jozef Amaat Acke, Rijmenam (BE)

(73) Assignee: Alcatel Lucent, Paris (FR)

( * ) Notice: Subject to any disclaimer, the term of this patent is extended or adjusted under 35 U.S.C. 154(b) by 822 days.

(21) Appl. No.: 12/458,007

(22) Filed: Jun. 29, 2009

(65) Prior Publication Data

US 2010/0030902 A1    Feb. 4, 2010

(30) Foreign Application Priority Data

Jun. 30, 2008 (EP) .................... 08290629

(51) Int. Cl.
  *G06F 15/16* (2006.01)
(52) U.S. Cl.
  USPC ....................................... 709/228
(58) Field of Classification Search
  USPC ....................................... 709/228
  See application file for complete search history.

(56) References Cited

U.S. PATENT DOCUMENTS

| | | | |
|---|---|---|---|
| 6,233,686 B1 | 5/2001 | Zenchelsky et al. | |
| 2003/0182422 A1 | 9/2003 | Bradshaw et al. | |
| 2006/0120305 A1 | 6/2006 | Van Den Bosch et al. | |
| 2006/0235971 A1* | 10/2006 | McCloghrie et al. | 709/225 |
| 2007/0073862 A1* | 3/2007 | Motoyama et al. | 709/224 |
| 2009/0037563 A1* | 2/2009 | Wu | 709/220 |
| 2009/0293045 A1* | 11/2009 | Cheriton | 717/136 |
| 2010/0138895 A1* | 6/2010 | Bouchat et al. | 726/1 |

FOREIGN PATENT DOCUMENTS

| | | |
|---|---|---|
| EP | 0 621 706 | 10/1994 |
| EP | 1 931 099 | 6/2008 |
| GB | 2 352 942 | 2/2001 |

OTHER PUBLICATIONS

Dslhome—Technical Working Group: "CPE WAN Management Protocol", May 2004, Internet Citation, XP002316355.
Office Action for corresponding European Application No. 08290629.8 dated Oct. 22, 2009.

* cited by examiner

*Primary Examiner* — Firmin Backer
*Assistant Examiner* — Natisha Cox
(74) *Attorney, Agent, or Firm* — Harness, Dickey & Pierce

(57) ABSTRACT

A method is described for managing a communication between a server device and a customer device. The method comprises interchanging between the server device and the customer device one or more parameter messages that are comprising a parameter description for a parameter name. The parameter description does consist of an hierarchical tree-like structure of characters with each level separated by a predefined character (dot). The method further comprises a step of instantiating by an instantiating device of the customer device, an iterator associated to an index, for a next level of a parameter-sub-tree being part of the global parameter description, and a step of recalling an object array for the parameter-sub-tree with the next level having different values for its index starting with a predefined start-value and ending with a predefined end-value.

11 Claims, 2 Drawing Sheets

METHOD FOR MANAGING A COMMUNICATION BETWEEN A SERVER DEVICE AND A CUSTOMER DEVICE

BACKGROUND

The present invention relates to a method for managing a communication between a server device and a customer device, and such a server device and a customer device.

Such a server device, customer device and method are known from the European Patent application with Publication number EP1931099 being published dd. Nov. 6, 2008 and from the DSL-Forum that has defined the Customer Premises Equipment Wide area Network Management Protocol, shortly called the WAN Management Protocol in the Technical Report TR-69. This TR069 Management Protocol is intended for communication between Customer Premises Equipment and an Auto-Configuration Server, shortly called an ACS. The version of May 2004 of this Technical Report TR-69 is to be found at www.dslforum.org.

The Technical Report TR-69 document describes at page 9, paragraph 1.6 the commonly used terminology. The following definitions are relevant for the further reading of this applications.

The ACS is an auto-configuration Server, as the component in a broadband network responsible for auto-configuration of the CPE for advanced services. The CPE is the Customer Premises Equipment whereby a B-NT is a broadband access CPE device capable of being managed by and ACS and being one form of a broadband CPE.

An RPC is a remote procedure call, whereby a "parameter" defines a name-value pair representing a manageable CPE parameter made accessible to an ACS for reading and/or writing.

In this way the TR069 Management Protocol defines a mechanism that encompasses secure auto-configuration of a CPE, and also incorporates other CPE management functions into a common framework. The TR069-Management protocol makes use of these Remote Procedure Calls—RPC Methods that defines a generic mechanism by which an ACS can read (get) or write (set) Parameters to configure a CPE and monitor CPE status and statistics.

At page 12 paragraph 2.3.1 of TR069 the Parameters are discussed more in details. There it is described that an RPC Method Specification defines a generic mechanism by which an ACS can read or write Parameters to configure a CPE and monitor CPE status and statistics. Each parameter consists of a name-value pair. The name identifies the particular Parameter, and has a hierarchical structure similar to files in a directory, with each level separated by a "." (dot). The value of a Parameter may be one of several defined data types. Parameters may be defined as read-only or may be defined as read-write. For some predefined objects, multiple instances may be defined. The individual instances are identified by an index number, assigned by the CPE.

A method is described for managing a communication between a server device e.g. and ACS and a customer device e.g. a CPE that comprises the steps of interchanging between the server device and the customer device one or more parameter messages such as e.g. a GET message, comprising a parameter description for a parameter name. The parameter description is consisting of a hierarchical tree-like structure of characters with each level separated by a predefined character (dot).

It has to be explained that interchanging such kind of messages is described in the TR-069 document at page 12 in paragraph 2.3.1 that describes the parameters. There it is explained that the parameters may be defined as read-only or read-write. Read-only Parameters may be used to allow an ACS to determine specific CPE characteristics, observe the current state of the CPE, or collect statistics. Writeable Parameters allow an ACS to customize various aspects of the CPE's operation. All writeable Parameters must also be readable. The value of some writeable Parameters may be independently modifiable through means other than the interface defined in this specification (e.g. some Parameters may also be modified via a LAN side auto-configuration protocol).

An example of a parameter is hereafter described in an abstract way. The name of the parameter is called e.g. "C" in a parameter-tree A.B.C.Instance_C.D. Presume that there are actual 100 instances for C existing on the CPE device and four values D1, D2, D3 and D4 parameter D. The 100 instances of parameter C are described in a next level i.e. Instance_C in the parameter description. The ParameterValue pairs on the device are then e.g.:

1)
A.B.C.1.D1=Val_D11
A.B.C.1.D2=Val_D12
A.B.C.1.D3=Val_D13
A.B.C.1.D4=Val_D14
2)
A.B.C.2.D1=Val_D21
A.B.C.2.D2=Val_D22
A.B.C.2.D3=Val_D23
A.B.C.2.D4=Val_D24
. . .
100)
A.B.C.100.D1=Val_D1001
A.B.C.100.D2=Val_D1002
A.B.C.100.D3=Val_D1003
A.B.C.100.D4=Val_D1004

In the event when the ACS is interested in the name of "C", but however, doesn't know the number of "C" instances, the ACS can retrieve the information according to two 2 ways which are described her below.

1) A first way to retrieve the parameters, the RPC-method "GetParameterValues" is used, but since the ACS doesn't know the number of instances in the array, a method with two steps with dynamic arrays is used.

Firstly the ACS sends the message "GetParameterNames" with next level on true:
GetParameterNames("A.B.C.", nextLevel=true)
Hereby the CPE sends the response with:
GetParameterNamesResponse("A.B.C.1", "A.B.C.2", . . . , "A.B.C.100").
In a second step, with this received response from the CPE, the ACS can construct the message GetParameterValues and transmits this request again to the CPE:
GetParameterValues("A.B.C.1.D1", "A.B.C.2.D1", "A.B.C.100.D1"),
The CPE generates the response:
GetParameterValuesResponse("A.B.C.1.D1","Val_D11", "A.B.C.2.D1", "Val_D21", . . . , "A.B.C.100.D1", "Val_D1001").

According to this first way, the parameter name argument is given as a full parameter name, and only the individual parameter value is returned.

A drawback of this first approach is that the ACS only learns the answers after two roundtrips of question/answer.

2) A second way to obtain the parameter values is immediately with the message GetParameterValues but with an incomplete path ending with a dot:
GetParameterValues("A.B.C."). The response from the CPE comprises:

GetParameterValuesResponse
("A.B.C.1.D1","Val_D11","A.B.C.1.D2","Val_D12",
"A.B.C.1.D3","Val_D13",A.B.C.1.D4", "Val_D14",
"A.B.C.2.D1","Val_$_D$21","A.B.C.2.D2","Val_D22",
A.B.C.2.D3","Val_D23",A. B.C.2.D4","Val_D24", . . . ,
"A.B.C.100.D1","Val_D1001","A.B.C.100.D2",
"Val_D1002", A.B.C.100.D3","Val_D1003",
A.B.C.100.D4","Val_D1004")

According to this second way, the parameter name argument is given as a partial path name whereby the request is to be interpreted as a request to return all of the Parameters in the branch of the naming hierarchy that shares the same prefix as the argument. A partial path name must end with a "." (dot) after the last node name in the hierarchy.

A drawback of this second approach is that the ACS receives too much information besides the values for the distinct parameters it needs to know.

So, the existing solutions provide a lot of load over the network and generate implementation complexity on the ACS. Since the ACS is dealing with millions of devices, scalability becomes with these solutions a concern in any ACS implementation. Latency and too much response time are introduced.

Whenever an array of objects must be retrieved, the second approach (i.e. partial path names) must be chosen. An example of such an array of objects is e.g. the state changes of different UPnP-devices in a home network such as a combined remote sensing instrument to measure temperature, humidity (hygrometer) and illuminances (lux-meter) or the state changes of an alarm detector in a home network, This second approach works well for the case that all underlying array objects need to be retrieved. For the more specific case when only a range of objects is of interest, the protocol doesn't define any range-restriction facilities. If a parameter-sub-tree such as described above for A.B.C. contains X underlying parameters, 100*X parameter values needs to be returned to the ACS. In many cases, this is not desired because:

The ACS is only interested in a sub-range (e.g. 50 . . . 100)
The ACS is only interested in new entries (e.g. new entries from 80 on)
The whole set of returned parameters might generate an inappropriate bandwidth usage burst and therefore compromise scalability on the ACS side.

SUMMARY

An object of the present invention is to provide a method for managing a communication between a server device and a customer device, and such a server device and a customer device, as described above but that ensures less load over the network and lower latency and reduction of response time.

According to the invention, this object is achieved due to the fact that the method further comprises the steps of:
  instantiating by an instantiating device of said customer device, for a next level of a parameter-sub-tree being part of said parameter description, an iterator being associated to an index; and
  recalling an object array for said parameter-sub-tree with said next level having different values for its index starting with a predefined start-value and ending with a predefined end-value.

It has to be explained that with the term "instantiating" it is meant that the Iterator is created, generated, originated and made available. In this way the subrange to be returned by means of the recalling step can be managed by means of the predefined start-value and predefined end-value.

The introduced index can be implemented by keeping the value of the index as an internal dedicated variable i.e. internal of the defined Iterator. However, the index can also be implemented as a reference to a parameter name comprised in the object model that is used as dedicated variable for the value of this index. This is a indirect implementation.

A convenient implementation is realized by further comprising a transmitting means at the server device to transmit to the customer device an iterator setting message that comprising the required parameter-sub-tree. The reception of the itarator setting message initiates hereby the previous step of instantiating. Furthermore when the transmitting means of the server device in addition transmits to the customer device a data retrieval message that comprises a name that identifies the instantiated iterator, the reception of the data retrieval message by the customer device initiates thereby the previous step of recalling.

It has to be explained that according to such an implementation the data retrieval message needs to include the name of the Iterator. This name might be defined at the side of the server device whereby it should be included in the former message i.e. the iterator setting message or the name of the iterator might as well be defined at the side of the customer device whereby it should be informed by means of another previous message to the server device.

Another characteristic implementation is that the basic method comprises a step of transmitting by means of a transmitter of the server device, to the customer device, a setting/retrieving message that comprises the required parameter-sub-tree. Upon reception of this message by the customer device, as well the step of instantiating as the step of recalling are initiated. It has to be remarked here that although some known messages of TR69-Management protocol might as well comprise a parameter-sub-tree, these messages clearly differ from the present described setting/retrieving message since this present message initiates at the customer device the instantiating step and the recalling step which steps are not executed by one of the actual defined TR69-Management messages.

Furthermore it has to be explained that the term "setting" in the terminology "setting/getting message" does not mean such as e.g. in TR69 setting messages that a parameter at the CPE is set at a predefined parameter value or attribute.

Another characteristic feature that can be used for both kind of main implementations comprises that upon the initiating of the step of instantiating, the predefined start-value is initialized to a first value e.g. zero.

Furthermore, the method can further comprise, upon the initiating of the step of recalling, a step of updating the predefined start-value to a second value such as e.g. actual end-value plus one.

Another possible implementation is that the method further comprises
a step of determining either the predefined start-value or the predefined end-value, in function of at least one of, respectively, a server start-value and a server end-value being provided by the server device to the customer device; and, respectively, a customer start-value and a customer end-value being present at the customer device. This means, in order to be clear, that the predefined start-value can be determined in function at least one of a server start-value, being provided by the server device to the customer device, and a customer start-value being present at the customer device. Furthermore, the predefined end-value can accordingly be determined in function of at least one of server end-value, being provided by the server device to the customer device, and a customer end-value being present at the customer device.

Yet, another possible implementation is that the different values of the iterator can be implemented by a predefined numerical order of values. Alternatively, the different values can be implemented by a predefined alphanumerical order of values.

It has to be remarked that the predefined order can be implemented with e.g. an increasing order or with a decreasing order.

Furthermore, anyone of the iterator setting message or the setting/retrieving message can be further implemented by comprising one or more characters such as (in line with the above example) D3 of one or more remaining levels e.g. D of the parameter description and thereby at the step of recalling defining a filter for the actual object array.

Finally, the step of instantiating can be further implemented by comprising a step of defining a step-parameter being associated to the iterator. Hereby the step of recalling RECALL will define the different values for the index in proportion to the step-parameter.

DETAILED DESCRIPTION OF EXAMPLE EMBODIMENTS

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

Figure 1:
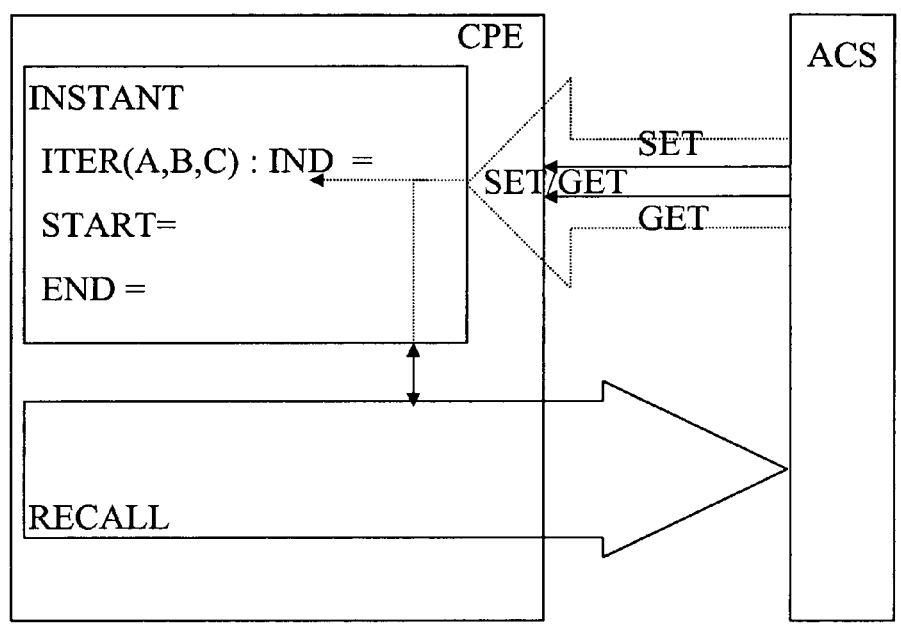
FIG. 1 illustrates a Customer Premises Equipment and an Auto Configuration server: coupled to each other.
Figure 2:
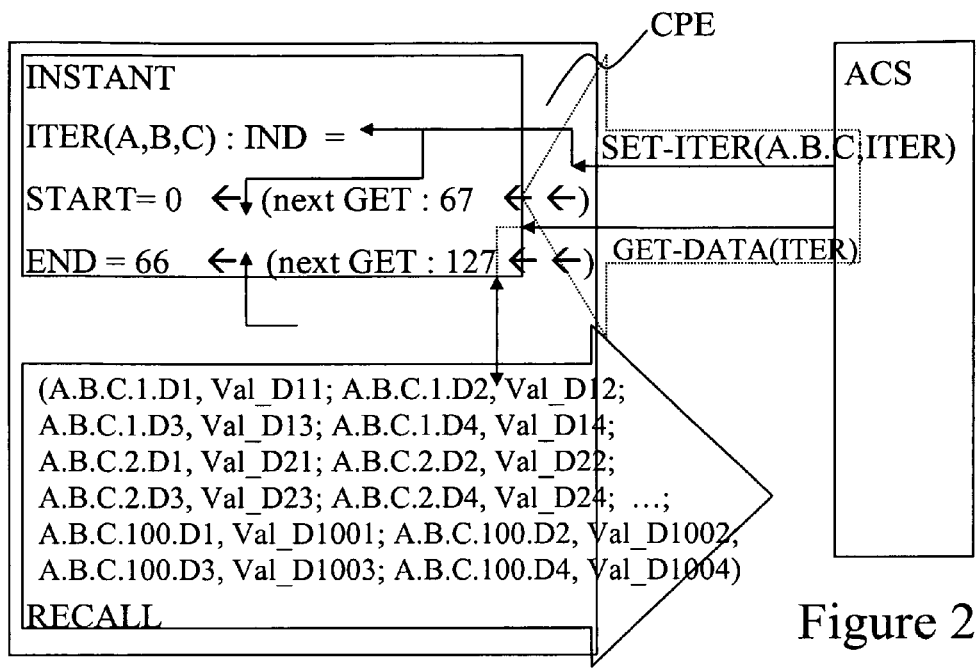
FIG. 2 illustrates processing an iterator setting message in the embodiment of FIG. 1.
Figure 3:
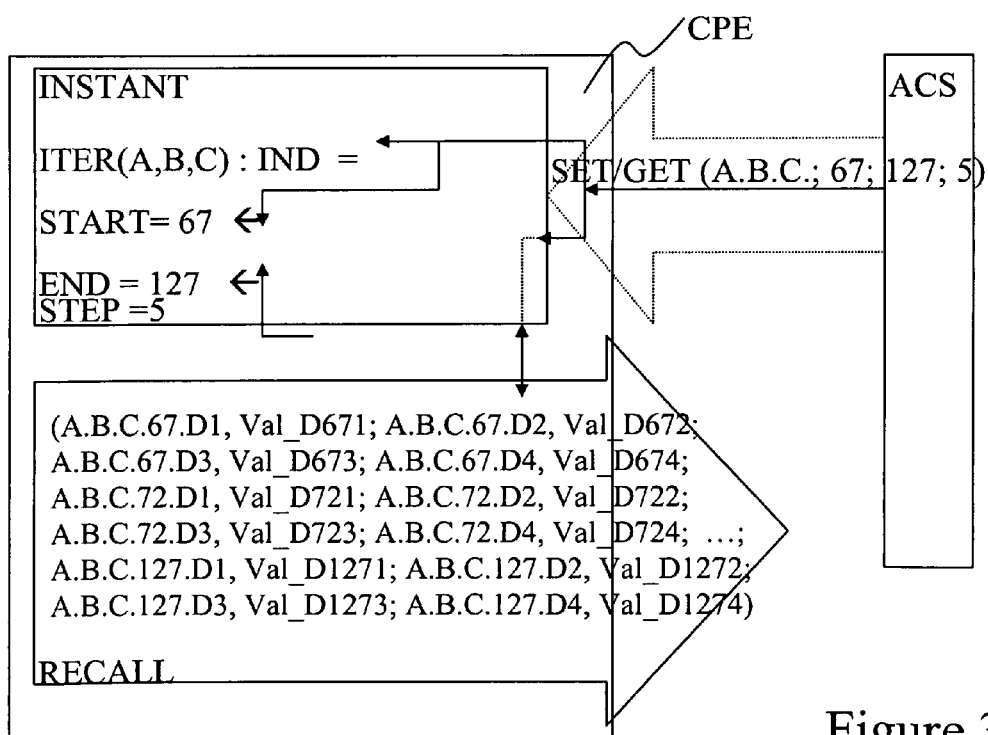
FIG. 3 illustrates processing in FIG. 1 according to an example embodiment.

The above and other objects and features of the invention will become more apparent and the invention itself will be best understood by referring to the following description of an embodiment taken in conjunction with the accompanying drawings wherein FIG. 1, FIG. 2 and FIG. 3, each, represents a Customer Premises Equipment coupled to an Auto Configuration Server ACS in an Access Communication Network.

The working of the device according to the present invention in accordance with its telecommunication environment that is shown in the three Figures will be explained by means of a functional description of the different blocks shown therein. Based on this description, the practical implementation of the blocks will be obvious to a person skilled in the art and will therefor not be described in details. In addition, the principle working of the method for managing a communication between a server device and a customer device will be described in further detail.

Referring to FIG. 1 a Customer Premises equipment CPE and Auto Configuration server ACS, shortly called hereafter Server ACS shown are and are coupled to each other. The Customer Premises Equipment CPE i.e. the customer device, comprises an instantiater INSTANT which is coupled to the Server ACS. Furthermore the Customer Premises Equipment comprises a recaller RECALL i.e. recalling means which is coupled to the instantiater INSTANT and to the Server ACS.

As an example it is preferred to introduce the above described example again i.e. with the description of a parameter consisting of an hierarchical tree-like structure of characters A.B.C.Inst_C.D.E with each level separated by a predefined character "." (dot). A parameter description identifies hereby one or more parameter names in a parameter message. It has to be explained that as a matter of example the predefined character is implemented by a "." (dot). However, it has to be clear that other kinds of predefined characters might as well be used to separate the different levels of characters of the hierarchical tree such as e.g. a "," (comma) or a "?" question-mark etc.

Referring to the example, the ACS would like to know the values for the different D's i.e. D1, D2, D3 and D4 but only for a limited range of instances for the character-level C.

The Server ACS might transmit a setting message SET. This setting message SET initiates a first step being executed by the instantiator INSTANT. The instantiator INSTANT is comprised in the Customer Premises Equipment CPE in order to instantiate an iterator associated to an index IND, for the next level Inst_C of a parameter-sub-tree A.B.C. being part of the parameter description A.B.C.Inst_C.D.E.

Consequently, the server ACS might transmit a data retrieving message GET. This retrieving message GET initiates a second step that is executed by the recaller RECALL. The recaller RECALL recalls an object array for the parameter-sub-tree A.B.C. with the next level Inst_C having different values for its index IND starting with a predefined start-value START and ending with a predefined end-value END.

It has to be remarked, and this will be further described hereafter, that the setting SET and retrieving GET might as well be integrated in one and the same message GET/SET which hereby initiates as well the first instantiating step as the second recalling step. This is shown in FIG. 1 by means of the dotted array. The dotted array shows a SET and a GET message which can be used by an ACS but also shows the integrated SET/GET message which can as well be used by an ACS. This will become clearer by means of a following description of two main embodiments in conjunction with the accompanying FIG. 2 and FIG. 3.

A possible implementation, but not limited thereto, is that the predefined start-value START and the predefined end-value END are kept in the Instantiator INSTANT by means of two variants. This is shown in FIG. 1 by means of START and END. The first variant keeps the predefined start-value START which can be determined e.g. in function of a server start-value i.e. a predefined value received from the Server ACS, and in function of a customer start-value i.e. a value being present at the customer premises equipment CPE itself. Similar, the second variant keeps the predefined end-value which can be determined e.g. in function of a server end-value i.e. a predefined value receive form the Server ACS, and in function of a customer end-value i.e. a value being present at the customer premises equipment CPE itself.

As mentioned, upon reception of the retrieving message GET, the object array is retrieved by the recaller RECALL for the parameter-sub-tree A.B.C. with the next level Inst_C having different values for its index IND starting with the value of the predefined start-value START and ending with the value of the predefined end-value END. Also the related value for each reconstructed parameter in the object array is collected to complete thereby the object array. The complete object array is transmitted from the Customer Premises Equipment CPE to the server ACS.

Referring to FIG. 2, an iterator setting message SET-ITER (A.B.C; ITER) is shown. The server ACS transmits to the customer device CPE the iterator setting message SET-ITER (A.B.C;ITER) that comprises the parameter-sub-tree A.B.C. and initiates thereby the step of instantiating which is to be executed by the instantiater INSTANT.

As a possible embodiment, upon reception of the setting message SET-ITER(A.B.C.;ITER) the predefined start-value START is initiated by the Instantiater INSTANT to a zero value. This means that the predefined start-value is a customer start-value i.e. present at the CPE.

Presume, as a possible embodiment, that the instances of the C parameters are reflecting alarm measurements which are taken upon regular time moments in the Customer Premises Equipment CPE. Each time when a measurement is performed the predefined end-value END is increased with one and reached already a value of 66. This means that also the predefined end-value is a customer end-value i.e. forced by the CPE itself.

It has to be remarked these values doesn't need to be present at the CPE but that as well the predefined start-value as the predefined end-value might be forwarded by the server ACS to the CPE in e.g. the setting message SET-ITER (A.B.C.; ITER).

Furthermore, it has to be remarked that although according to this possible embodiment shown in FIG. 2, the name ITER that identifies the iterator is defined by the Server ACS and is integrated in the setting message SET-ITER(A.B.C; ITER), the name that identifies the respective ieterator can as well be defined the CPE whereby the customer device CPE informs the server device ACS accordingly.

Furthermore, a data retrieval message is shown GET-DATA(ITER). The server ACS transmits to the customer device CPE the data retrieval message GET-DATA(ITER) that comprises the defined name ITER, identifying thereby the previously instantiated itereator ITER, and initiates thereby the step of recalling RECALL to be executed by the recaller RECALL.

Finally, according to the present embodiment, the predefined start-value START of the first variant is put to the predefined end-value plus one. In such a situation, upon initialization by the ACS of a next recalling step the first 66 measurements, which are already present at the ACS, are not recalled anymore. Furthermore the predefined end-value is increased each time when a new alarm measurement is taken at the CPE with one and has e.g. a value of 127 at the time of this next recalling step.

Referring to FIG. 3 a following main embodiment is described. According to this embodiment the previous mentioned getting message and data retrieving message are indeed integrated in one message, called a setting/retrieving message SET/GET(A.B.C.; 67; 127; 5) that comprises the parameter-sub-tree A.B.C. and thereby initiates respectively the step of instantiating to be executed by the Instantiator INSTANT and the step of recalling to be executed by the recaller RECALL.

A possible implementation is shown in FIG. 3 by comprising in the setting/retrieving message SET/GET(A.B.C.; 67; 127; 5) a value for the predefined start-value START and a value for the predefined end-value, such as, respectively, 67 and 127.

Furthermore, a particular embodiment is shown hereby the inclusion of a step-parameter in the SET/GET(A.B.C.; 67; 127; 5) i.e. STEP=5 is introduced. This means that upon initialization of the step of instantiating INSTANT also a step-parameter STEP=5 is defined in association to the iterator ITER and that thereby at the step of recalling RECALL the different values for the index IND are defined in proportion to the step-parameter.

It has to be explained that in "proportion" can be implemented as "being skipped" or as "a subrange". Indeed, according to the skipping implementation the advantage is e.g. known when the ACS determines upon processing of previous alarm measurements, that the measurements might be transmitted upon a less frequent basis. This is shown in FIG. 3. The value of the iterator is not stepping with only "1" from start-value to end-value but with steps of "5" and hereby skipping 4 measurements out of 5. Hereby bandwidth over the access network can again be saved.

According to the "subrange" implementation, the object array is constructed several times for one recalling step. Indeed the object array is firstly constructed for e.g. the five first measurements, without skipping i.e. in steps of "1" and being transmitted. Hereafter another object array is constructed for the next 5 measurements and being transmitted etc. This means that for only one GET-DATA(ITER) message comprising such a STEP value, a plurality of object arrays are created and transmitted. The advantage of comprising a STEP value is that the bandwidth can be more fairly balanced among the different CPE's and the ACS.

Finally it has to be remarked that yet another implementation can be described by comprising in the iterator setting message SET-ITER, according to the first main implementation, or the setting/retrieving message SET/GET, according to the second main implementation, one or more characters such as e.g. D3 of a remaining level D of the parameter description A.B.C.Inst_C.D.E. Hereby, a filter is defined in association with the Iterator and at the time of the step of recalling, the filter will be applied on the constructed object array. This means for instance that when the server ACS is interested in the values for the different C instances but only for the values of the selected defined parameter such as D3, the ACS will comprise this filter in the setting message and again bandwidth in the access network can be saved.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method for managing a communication between a server device and a customer device said method comprising:
   interchanging between said server device and said customer device one or more parameter messages including a parameter description for a parameter name, said parameter description consisting of an hierarchical tree-like structure of characters with each level separated by a predefined character (dot);
   instantiating by an instantiating device of said customer device an iterator associated to an index for a next level of a parameter-sub-tree being part of said parameter description;

recalling an object array for said parameter-sub-tree with said next level having different values for its index starting with a predefined start-value and ending with a predefined end-value; and determining any one of said predefined start-value and said predefined end-value in function of at least one of, respectively, a server start-value and a server end-value being provided by said server device to said customer device and, respectively, a customer start-value and a customer end-value being present at said customer device.

2. The method according to claim 1, wherein said method further comprises:

transmitting by said server device to said customer device an iterator setting message comprising said parameter-sub-tree and thereby initiating said step of instantiating; and transmitting by said server device to said customer device a data retrieval message comprising a name identifying said iterator and thereby initiating said step of recalling.

3. The method according to claim 1, wherein said method further comprises the steps of defining said name by said customer device and informing said server device accordingly.

4. The method according to claim 1, wherein said method further comprises transmitting by said server device to said customer device a setting/retrieving message comprising said parameter-sub-tree and thereby initiating respectively said step of instantiating and said step of recalling.

5. The method according to claim 2, wherein said method further comprises upon said initiating of said step of instantiating, initializing said predefined start-value to a first value.

6. The method according to claim 2, wherein said method further comprises upon said initiating of said step of recalling, updating said predefined start-value to a second value.

7. The method according to claim 1, wherein by implementing said different values with a predefined numerical order.

8. The method according to claim 1, wherein by implementing said different values with a predefined alphanumerical order.

9. The method according to claim 2, wherein by comprising in any one of said iterator setting message and said setting/retrieving message, one or more characters of one or more remaining levels of said parameter description and thereby at said step of recalling defining a filter for said object array.

10. The method according to claim 1, wherein said step of instantiating comprises a step of defining a step-parameter being associated to said iterator and thereby at said step of recalling defining said different values for said index in proportion to said step-parameter.

11. A customer device coupled to a server device for communication with said server device by interchanging one or more parameter messages comprising:

a parameter description for a parameter name, said parameter description consisting of an hierarchical tree-like structure of characters with each level separated by a predefined character, wherein said customer device comprises an instantiating means, coupled to said server device to instantiate an iterator being associated to an index, for a next level of a parameter-sub-tree being part of said parameter description, a recalling means, coupled to said instantiating means and said server device, to recall an object array for said parameter-sub-tree with said next level having different values for its index starting with a predefined start-value and ending with a predefined end-value and a determining means, coupled to said server device, to determine any one of said predefined start-value and said predefined end-value in function of at least one of, respectively, a server start-value and a server end-value being provided by said server device to said customer device and, respectively, a customer start-value and a customer end-value being present at said customer device.

* * * * *